United States Patent
Hayashi et al.

(10) Patent No.: US 8,715,559 B2
(45) Date of Patent: May 6, 2014

(54) NON-POROUS SINTER MOLDED ARTICLE OF TETRAFLUOROETHYLENE RESIN, EXPANDED TETRAFLUOROETHYLENE RESIN MOLDED ARTICLE, PRODUCING METHODS THEREFOR, COMPOSITE MEMBER, FILTER, IMPACT DEFORMATION ABSORBER AND SEALING MATERIAL

(75) Inventors: Fumihiro Hayashi, Osaka (JP); Shinichi Kanazawa, Osaka (JP); Atsushi Uno, Osaka (JP); Akira Udagawa, Gunma (JP); Shigetoshi Ikeda, Gunma (JP); Toshiaki Yagi, Gunma (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 186 days.

(21) Appl. No.: 11/988,892

(22) PCT Filed: Sep. 8, 2006

(86) PCT No.: PCT/JP2006/317898
§ 371 (c)(1),
(2), (4) Date: Jan. 16, 2008

(87) PCT Pub. No.: WO2007/032287
PCT Pub. Date: Mar. 22, 2007

(65) Prior Publication Data
US 2009/0029136 A1 Jan. 29, 2009

(30) Foreign Application Priority Data
Sep. 15, 2005 (JP) .............................. P.2005-268592

(51) Int. Cl.
*B29C 39/38* (2006.01)
*B29C 51/00* (2006.01)
*B32B 3/26* (2006.01)

(52) U.S. Cl.
USPC ... 264/415; 264/331.14; 264/127; 428/315.7; 428/220

(58) Field of Classification Search
USPC ............. 428/421, 411.1, 304.4, 314.2–315.7; 428/422; 264/331.14, 415, 127; 521/50–189
See application file for complete search history.

(56) References Cited

U.S. PATENT DOCUMENTS

| | | | |
|---|---|---|---|
| 4,710,331 A * | 12/1987 | Nobuo et al. .................. 264/41 |
| 5,473,018 A | 12/1995 | Namura et al. | |
| 5,910,277 A * | 6/1999 | Ishino et al. .................. 264/127 |
| 5,928,414 A * | 7/1999 | Wnenchak et al. ............. 95/280 |
| 5,939,198 A * | 8/1999 | Howard et al. ............... 428/421 |

FOREIGN PATENT DOCUMENTS

| | | |
|---|---|---|
| CN | 1088152 A | 6/1994 |
| JP | 42-13560 | 8/1967 |
| JP | 53-55379 | 5/1978 |
| JP | 61-146522 | 7/1986 |
| JP | 5-202217 | 8/1993 |
| JP | 7-292144 | 11/1995 |
| JP | 2000-26509 | 1/2000 |
| JP | 2002-509557 | 3/2002 |
| JP | 2003-80590 | 3/2003 |
| JP | 2003-306573 | 10/2003 |
| WO | WO 94/00511 | 1/1994 |

OTHER PUBLICATIONS

Fisher et al. "Effect of Ionizing Radiation on the Chemical Composition, Crystalline Content and Structure, and Flow Properties of Polytetrafluoroethylene". Journal of Polymer Science: Polymer Chemistry Edition, vol. 19, 2465-2493. John Wiley & Sons, Inc. (1981).*
Price et al. "Thermal conductivity of PTFE and PTFE composites". Thermochimica Acta, 392-393 (2002). pp. 231-236.*
"Reference: Polymer Properties". Aldrich, Retrieved Oct. 20, 2013; pp. 52-53.*
Taiwan Office Action, and English translation thereof, issued in Taiwanese Patent Application No. 095133989 mailed Sep. 13, 2012.
Chinese Office Action, with English translation, issued in Chinese Patent Application No. 200680026360.2, mailed Sep. 30, 2010.
Deng, Y., et al., "Study of the Melting Crystallization Behavior of Tetrafluoroethylene under Radiation Degradation by Use of DSC", Chemical World, 1996, vol. 2.

* cited by examiner

*Primary Examiner* — Prashant J Khatri
(74) *Attorney, Agent, or Firm* — McDermott Will & Emery LLP

(57) ABSTRACT

A tetrafluoroethylene resin molded article obtained by fusing PTFE by heating a tetrafluoroethylene resin by heating, and then executing a gradual cooling or a cooling including a holding at a temperature equal to or higher than 313° C. and lower than 321° C. for 10 minutes or longer, and having, when heated to 365° C., then cooled to 245° C. with a rate of −1° C./min, and then heated to 365° C. with a rate of 10° C./min, a heat of fusion which, within a range from 296 to 343° C., is equal to or larger than 32 J/g and less than 47.8 J/g, a porous article obtained by expanding the molded article, and a composite article, a filter, an impact deformation absorber and a sealing material utilizing the molded article or the porous article.

4 Claims, 2 Drawing Sheets

ENDOTHERMIC CURVE

EXOTHERMIC CURVE

NON-POROUS SINTER MOLDED ARTICLE OF TETRAFLUOROETHYLENE RESIN, EXPANDED TETRAFLUOROETHYLENE RESIN MOLDED ARTICLE, PRODUCING METHODS THEREFOR, COMPOSITE MEMBER, FILTER, IMPACT DEFORMATION ABSORBER AND SEALING MATERIAL

RELATED APPLICATIONS

This application is the U.S. National Phase under 35 U.S.C. §371 of International Application No. PCT/JP2006/317898, filed on Sep. 8, 2006, which in turn claims the benefit of Japanese Application No. 2005-268592, filed on Sep. 15, 2005, the disclosures of which Applications are incorporated by reference herein.

TECHNICAL FIELD

The present invention relates to a tetrafluoroethylene resin molded article adapted for use in a sealing material and the like, and more particularly to a porous expanded tetrafluoroethylene resin molded article adapted for use in a filter (separating membrane) and the like. The present invention also relates to producing methods for the tetrafluoroethylene resin molded article and the expanded tetrafluoroethylene resin molded article, and a composite member, a filter, an impact deformation absorber and a sealing material utilizing such tetrafluoroethylene resin molded article and expanded tetrafluoroethylene resin molded article.

BACKGROUND TECHNOLOGY

Tetrafluoroethylene resin (hereinafter abbreviated as PTFE) is utilized, owing to excellent properties thereof such as a chemical resistance and a heat resistance, in engineering plastics, electronic parts, medical materials and the like. In particular, a porous article utilizing PTFE as the base material (PTFE porous member) is utilized in filters such as a gas separating membrane and a liquid separating membrane utilizing the uniform and fine porous structure thereof, and in medical materials such as an artificial blood vessel and in a degassing or gas-dissolving membrane for an aqueous liquid, utilizing a water-repellent property thereof.

The PTFE porous article, employed in a filter or the like, is required to have a fine pore size for enabling a filtered separation of fine particles, a permeability and a permeating flow rate for obtaining a satisfactory filtration efficiency, and a satisfactory strength. Also a high porosity is desired in order to obtain a satisfactory permeability and a satisfactory permeating flow rate.

As a producing method for such PTFE porous article, JP-B-42-13560 (Patent Reference 1) describes a method of mixing a liquid lubricant (additive) with PTFE fine powder as a raw material to form a press-molded substance, then extruding it into a predetermined form, and expanding the extruded article along the axial direction to form a porous structure, followed by a sintering. In addition to such expanding method, other methods of forming fine pores are known such as a method of mixing a pore-forming agent and later extracting the pore-forming agent, and a foaming method utilizing a foaming agent.

In these commonly utilized methods, the press-molded substance of PTFE particles contains voids resulting from gaps between the particles and from elimination of the additive, and such voids constitute a limit in forming small pores. It is therefore difficult, by these methods, to obtain a filter enabling removal of particles of a size less than 0.1 μm.

Consequently proposed is a method of once fusing the press-molded substance thereby causing a contraction and extinguishing the gaps between the particles and then forming fine pores by an expanding, and for example JP-A-53-55379 (patent reference 2) describes a method of heating a molded substance of PTFE particles to 327° C., which is the melting temperature of PTFE, or higher, and executing a gradual cooling after heating to promote a crystallization, followed by an expanding. This method allows to extinguish the gaps of the particles in the PTFE molded substance by fusing, and, by the subsequent expanding, to form fine pores of 0.1 to 100 μm or even smaller. It is however difficult, with this method, to obtain a high porosity of 30% or higher (corresponding to a density of 1.58 g/cc or less) while maintaining the fine pores.

The porosity is considered to be improved by increasing the expand rate. Also JP-A-61-146522 (patent reference 3) describes that, even in a molded substance that is already sintered, the expand rate thereof can be increased by an irradiation with an ionizing radiation of a dose of from 10 Gy to 10 kGy (from $10^3$ to $10^6$ rad).

However, in the prior expanding method of PTFE, an increase in the expand rate increases the porosity but also causes an increase in the pore size. Therefore, in case of obtaining a filter of a small pore size enabling removal of fine particles of a size less than 0.1 μm, as necessitated in the highly advanced integration level of semiconductors, the expand rate cannot be made high, so that the porosity becomes lower to result in an extremely low filtering ability.

Patent reference 1: JP-B-42-13560
Patent reference 2: JP-A-53-55379
Patent reference 3: JP-A-61-146522

DISCLOSURE OF THE INVENTION

Problems to be Solved by the Invention

As described above, it is difficult, in the prior producing methods for PTFE porous article, to produce a PTFE porous article having a pore size enabling filtration of particles of a size less than 0.1 μm and a porosity larger than 30%.

An object of the present invention is to provide a PTFE molded article having an excellent deformability and capable, by an expanding thereof, of providing a PTFE porous article having fine pores of uniform pore size and having a high porosity. In particular, the present invention is to provide a PTFE porous article, obtained by expanding the PTFE molded article and having pores enabling filtration of fine particles of a size less than 0.1 μm and a porosity larger than 30%.

Another object of the present invention is to provide methods for producing such PTFE molded article and PTFE porous article, and to provide a composite material, a filter and a sealing material utilizing such PTFE molded article and PTFE porous article.

Means for Solving the Problems

As a result of intensive investigation undertaken by the present inventor, it has been found that:

a PTFE molded article, which is obtained by once fusing PTFE to extinguish gaps between particles followed by a gradual cooling, and of which a heat of fusion, in a case where a sample is fused under heating, then gradually cooled and again heated, is equal to or higher than 32 J/g and less than 47.8 J/g, has a high deformability and is significantly superior to the prior PTFE molded article in an impact absorbing property and a deformation following property; and an expanding of such molded article, beyond an ordinary yield point appearing at first on a load-elongation curve and until a next point of inflection appearing before breaking, allows to stably obtain a PTFE molded article (PTFE porous article) which enables removal of fine particles of a size less than 0.1 μm and has a high porosity of 30% or higher, and which is difficult to obtain in the prior technologies: whereby the present invention has been made.

Thus, the present invention provides, as described in claim 1, a PTFE molded article which has, when heated to 365° C., then cooled to 305° C. with a rate of −1° C./min, then further cooled to 245° C. and heated to 365° C. with a rate of 10° C./min, a heat of fusion within a range from 296 to 343° C. equal to or larger than 32 J/g and less than 47.8 J/g.

The PTFE molded article of the invention can be obtained by fusing PTFE by heating to the melting temperature thereof or higher, and then executing a gradual cooling and/or a cooling including a holding at a temperature equal to or higher than 313° C. and lower than 321° C. for 10 minutes or longer. More specifically, in such manufacture, PTFE is fused by heating to the melting temperature (327° C.) or higher, preferably to 340° C. or higher. More preferably, it is maintained at 340° C. or higher for 1 minute or longer.

An example of the PTFE to be heated and fused is a molded substance formed by pressing PTFE particles produced for example by emulsion polymerization. Such molded substance contains gaps of particles, and holes and voids resulting from extraction of additives. However, the fusing under heating extinguishes such holes and voids or substantially minimizes the continuous voids.

After heating and fusing, the PTFE is cooled. Such cooling generates crystals in PTFE. The heat of fusion of the PTFE molded substance depends on the amount of generated crystals, which is in turn influenced by the cooling rate. Therefore, in order to obtain a heat of fusion within the aforementioned range, the cooling is executed by a gradual cooling (slow cooling) and/or a cooling including a holding at a temperature equal to or higher than 313° C. and lower than 321° C. for 10 minutes or longer.

The gradual cooling is preferably executed with a cooling rate of −3.0° C./min or less, and more preferably with a cooling rate of −2.0° C./min or less.

Even with a cooling rate outside the aforementioned range, the holding at a temperature equal to or higher than 313° C. and lower than 321° C. for 10 minutes or longer allows to accelerate crystallization. The present inventor has found that the crystallization has proceeded efficiently by executing such holding during or after the cooling after once heating to the melting temperature or higher, and has thus developed a method of achieving a crystallization of a predetermined level in stabler and efficient manner.

Stated differently, while the gradual cooling requires a high-level temperature control, the heat treatment method by a holding at a constant temperature does not require such high-level temperature control and can achieve a heat treatment in stabler and more uniform manner. Also a gradual cooling from the melting temperature or higher cannot be executed in a state of a continuous web roll because of a mutual fused adhesion of PTFE, and the heating and gradual cooling have to be executed over a long period by unwinding the product with a very low linear speed. On the other hand, in the heat treatment method by holding at a constant temperature, it is possible to form a continuous web roll after cooling to a temperature lower than the melting temperature and to promote the crystallization in such rolled state, whereby a mass production is made possible by a large-scale batch process.

The PTFE molded article of the invention is characterized in having a heat of fusion, measured under predetermined conditions, within a predetermined range. More specifically, when it is heated to 365° C., then cooled to 305° C. with a rate of −1° C./min, then further cooled to 245° C. and heated to 365° C. with a rate of 10° C./min, a heat of fusion within a range from 296 to 343° C. is equal to or larger than 32 J/g and less than 47.8 J/g.

More specifically, the heat of fusion is preferably measured under following conditions. A heating is executed from the room temperature to 245° C. at a rate of 50° C./min, and then to 365° C. at a rate of 10° C./min (first step). Subsequently a cooling is executed to 350° C. at a rate of −10° C./min, followed by a holding at 350° C. for 5 minutes, and a cooling is executed from 350° C. to 330° C. at a rate of −10° C./min, and from 330° C. to 305° C. at a rate of −1° C./min (second step). Then, after a cooling is executed from 305° C. to 245° C. at a rate of −50° C./min, a heating is executed from 245° C. to 365° C. at a rate of 10° C./min (third step), and an endothermic amount in a range from 296 to 343° C. in this third step is taken as the heat of fusion. The heating, cooling and endothermic amount are measured preferably with a differential scanning calorimeter, and, in a heat flux type differential scanning calorimeter, the measurement is usually conducted with a sample amount of about from 10 to 20 mg.

The measuring method above for the heat of fusion can be used for controlling the molecular weight of PTFE, and is very useful for the production management. As PTFE has a high melting temperature and a high viscosity and is insoluble in solvents, the molecular weight cannot be measured by a fused viscosity, a light scattering or an osmotic pressure method. Therefore, the molecular weight of PTFE is generally estimated from a specific gravity (ASTM D1457-56T) or a strength of a molded article. However, the molecular weight determined by these methods involves a significant fluctuation, and a relative comparison of the molecular weight in molded products different in shape, dimension and structure is practically impossible.

However, when PTFE is once fused and then slowly cooled at a predetermined rate to cause a recrystallization, the crystallization proceeds less for a larger molecular weight, whereby the heat of fusion becomes smaller when fused next time, and the heat of fusion becomes larger for a smaller molecular weight. Therefore, the molecular weight of PTFE can be estimated from the measured value of the heat of fusion. The present inventor finds that the heat of fusion after a predetermined thermal hysteresis as described above is very useful in estimating the molecular weight and can be used for the production control. Also instead of the heat of fusion, an exothermic amount at the gradual cooling in the aforementioned method can be used for estimating the molecular weight and may be utilized in the production control.

In PTFE commonly used for molding, the heat of fusion in the third step, measured under the aforementioned conditions, is less than 30 J/g. Therefore, the heat of fusion is estimated as less than 30 J/g also in a molded article of such resin. It is estimated that such resin is employed in molding or paste extrusion molding, in consideration of the molding property and the strength of molded article. For example in paste extrusion molding, in order to obtain a uniform quality such as in molded dimension or in mechanical strength, a resin of about 20 J/g or less, or 25 J/g or less, is employed according to the dimension of the molded article.

The PTFE molded article of the invention is different, from the prior PTFE molded article, in having a heat of fusion equal to or larger than 32 J/g and less than 47.8 J/g, and, owing to such difference, has characteristics of a higher deformability and significantly superior impact absorbing property and deformation following property, in comparison with the prior PTFE molded article, thereby being very effective in applications such as a PTFE pressure-sensitive adhesive tape of a high adhesiveness and a solid gasket material of a high sealing property. Also the molded article of the invention has characteristics capable, by being expanded, of producing a PTFE porous article having small pores and a high porosity.

The present invention provides, as described in claim 2, an expanded PTFE molded article (PTFE porous article), obtained by expanding the PTFE molded article.

The expanding is preferably executed beyond an ordinary yield point appearing at first on a load-elongation curve and until a next point of inflection appearing before breaking. As a result of investigation undertaken by the present inventor, it is found that a uniform expanding is possible in the expanding to such inflection point, and such inflection point is a limiting point of the uniform expanding. Hereinafter, this inflection point will be called a second yield point, and the ordinary yield point appearing first will be called a first yield point.

In order to further clarify the relation of the first yield point and the second yield point, FIGS. 1(a) and 1(b) illustrate representative patterns of a load-elongation curve (the curve in the vicinity of the first yield point may not show a peak and may become a gentle curve). In FIGS. 1(a) and 1(b), there are shown a first yield point P1, a second yield point P2 and a breaking point P3. The second yield point (P2) is considered as an expandable point, and the expanding to this range is considered to form fine pores with little fluctuation in the size. An expanding beyond the second yield point is liable to result in a larger fluctuation in the pore size and defects such as pinholes.

The PTFE molded article of the invention shows a large elongation at this second yield point. On the other hand, fine pores generated by the expanding up to the second yield point has a small pore size and little fluctuation in the pore size. It is therefore considered possible to achieve a large expanding while forming fine pores with little fluctuation in size, thereby obtaining a high porosity.

When the PTFE porous article is employed as a filter, an ability of removing particles of a size less than 0.1 μm can be represented by a permeability for standard particles of a size of 0.055 μm. The present invention provides, in claim 3, a PTFE molded article which is an expanded PTFE molded article of claim 2, which has a fine pore size capable of filtration of standard particles of a size of 0.055 μm by 10% or more and has a porosity larger than 30%. This molded article, having a fine pore size capable of filtration of standard particles of a size of 0.055 μm by 10% or more and having a porosity larger than 30%, can be used advantageously for producing a precise filter (separating membrane) and the like.

The PTFE molded article or the expanded PTFE molded article of the invention preferably has a thickness of 50 μm or less. Claims 4 and 5 correspond to such preferred embodiment. With a thickness of 50 μm or less, the porous molded article after expanding (expanded PTFE molded article) can provide a high processing ability (such as flow rate) in case of use as a separating membrane. For obtaining a high flow rate, the thickness is more preferably 20 μm or less. The thickness is not particularly restricted in a lower limit. In the PTFE molded article prior to expanding, the thickness may be within a range providing a mechanical strength enabling an expanding, and, in the expanded PTFE molded article, the thickness may be within a range providing a desired filterability for fine particles.

The present invention provides, in addition to the PTFE molded article, a producing method therefor. An invention described in claim 6 provides a producing method for a PTFE molded article including: a fusing step of fusing PTFE, which, when heated to 365° C., then cooled to 305° C. with a rate of −1° C./min, then further cooled to 245° C. and heated to 365° C. with a rate of 10° C./min, has a heat of fusion within a range from 296 to 343° C. equal to or larger than 32 J/g and less than 47.8 J/g, by heating to a melting temperature thereof or higher, a step of gradually cooling the fused resin, and/or a step of holding at a temperature equal to or higher than 313° C. and lower than 321° C. for 10 minutes or longer. The step of holding at a temperature equal to or higher than 313° C. and lower than 321° C. for 10 minutes or longer may be executed in the course of cooling after the fusing step, or executed by holding at such temperature range by heating, after the cooling.

This producing method is characterized in employing PTFE having a heat of fusion in the third step equal to or larger than 32 J/g and less than 47.8 J/g. PTFE having a heat of fusion in the third step equal to or larger than 32 J/g and less than 47.8 J/g may be obtained for example by a method of irradiating PTFE having a heat of fusion less than 32 J/g with an ionizing radiation such as a gamma ray, an X-ray, an ultraviolet light or an electron beam, or by a method utilizing a decomposition reaction under heating.

The molded article of the invention can be obtained by fusing PTFE, having a heat of fusion equal to or larger than 32 J/g and less than 47.8 J/g, under heating to the melting temperature or higher, followed by cooling under the aforementioned conditions. Conditions of heating in the fusing step and of cooling in the cooling step are same as those described for the molded article of the invention.

PTFE having a heat of fusion equal to or larger than 32 J/g and less than 47.8 J/g, employed as a raw material of the producing method of the invention, is not particularly restricted in a shape, and may be a molded substance for example of a sheet form. Also usable is powder or granular PTFE of which a heat of fusion is so regulated as equal to or larger than 32 J/g and less than 47.8 J/g. Claim 7 corresponds to such embodiment. In case of utilizing powder or granular PTFE, a molding is executed for example after the fusing step.

As the powder or granular PTFE to be employed as the raw material in the embodiment of claim 7, powder or granular PTFE of which a heat of fusion is regulated in the aforementioned range may be used as it is (as singly), or a mixture of powder or granular PTFE of at least two kinds, of which at least one has a heat of fusion outside the aforementioned range, may also be used.

The PTFE molded article of the invention may also be obtained by a method of forming a molded article by employing PTFE having a heat of fusion less than 32 J/g under conditions similar to those in the embodiment of claim 6, and regulating the heat of fusion of the molded article as equal to or larger than 32 J/g and less than 47.8 J/g (claim 8).

PTFE having a heat of fusion less than 32 J/g is often preferable from the standpoint of the molding property. Therefore, in the embodiment of claim 8, a raw material having a heat of fusion (molecular weight) suitable for molding is selected for molding, and is then regulated to a heat of fusion (molecular weight) suitable for expanding, namely equal to or larger than 32 J/g and less than 47.8 J/g. This method, allowing to provide an optimum heat of fusion (molecular weight) in all the steps from molding to expanding, is preferable for producing a membrane uniform in dimension, structure and characteristics, and enables stable production of products.

The method of regulating the heat of fusion as equal to or larger than 32 J/g and less than 47.8 J/g is not particularly restricted, and examples thereof include a method of irradiation with an ionizing radiation such as a gamma ray, an X-ray, an ultraviolet light or an electron beam, and a method utilizing a decomposition reaction under heating. These methods enables a regulation of the heat of fusion, even after molding.

The irradiation with an ionizing radiation is preferable, as it enables an efficient regulation of the heat of fusion by a simple operation. Claim 9 corresponds to an embodiment of executing such irradiation with an ionizing radiation after the molding, thereby regulating the heat of fusion.

The irradiation dose of the ionizing radiation is so regulated that the heat of fusion in the third step becomes equal to or larger than 32 J/g and less than 47.8 J/g. The production efficiency can be improved by employing an appropriate method, for example a method of utilizing gamma ray (for example utilizing Co60 as a radiation source) for a molded article of a large volume, or a method of continuous electron beam irradiation for a continuous article such as a sheet or a tube.

Claim 10 provides a producing method for the PTFE molded article which is a producing method for an expanded PTFE molded article, further including: after the cooling step, a step of expanding the obtained PTFE molded article, namely a producing method for a PTFE porous article (PTFE molded article of claim 2).

Expanding of a commonly used PTFE resin for molding, namely a molded substance of a resin having a heat of fusion in the third step less than 30 J/g, cannot provide a porous article having a pore size enabling removal of fine particles of a size less than 0.1 μm and having a porosity equal to or higher than 30%. A lower molecular weight of the resin can increase the crystallization degree in the steps of fusing and cooling, thereby increasing the heat of fusion. However, a lower molecular weight deteriorates the molding property and the mechanical strength, thereby leading to drawbacks such as significantly uneven characteristics and an insufficient resistance to deformation or expanding after the molding. As a result of an intensive investigation undertaken by the present inventor, it is found that a resin, having the heat of fusion in the third step within a certain range, namely equal to or larger than 32 J/g and less than 47.8 J/g, selected as the raw material allows to stably produce a porous article having a pore size enabling filtration of fine particles of a size less than 0.1 μm and having a porosity equal to or larger than 30%.

The expanding may be executed with a tenter, as in the prior expanding of PTFE. The expanding may be executed in the longitudinal direction, in the width direction, or biaxially.

At the expanding, a temperature equal to or lower than the melting temperature of PTFE, preferably equal to or lower than 200° C. and more preferably equal to or lower than 100° C. and equal to or higher than 30° C. is desirable in improving the expandability, thereby enabling a stable manufacture. A particularly preferable expanding temperature is within a range of from 40 to 70° C.

In case of subjecting PTFE to an irradiation of a radiation, to be explained later, for the purpose of regulating the heat of fusion, the mechanical strength may be lowered in a portion subjected to such irradiation of radiation. Thus, as the article under working may be broken by a grip of the tenter, it is preferable to increase the strength of a portion to be gripped by the grip. It can be realized by a method of utilizing PTFE with an improved mechanical strength, for example by employing a thicker formation, a different formulation or a higher molecular weight in the portion to be gripped. Also employable is a method of reinforcing a gripped portion by adhering a tape, or a method of shielding a gripped portion thereby suppressing decomposition by the irradiation with the radiation.

Also after porosifying by expanding, a process of executing heating/cooling at a temperature of from 200 to 380° C. with a fixed dimension may be added to improve the dimensional stability of the molded article.

The expanded PTFE molded article, when used as a filter or the like, preferably has a thickness of 50 μm or less as described above. However, such thickness may be unable to obtain a sufficient strength as a filter or the like. In such case, it is preferable to fix such expanded PTFE molded article on a support member having a lower bubbling point and a higher breaking load than in the molded article, for use as a composite article. The support member, having a lower bubbling point, does not lower the filtration rate and, having a higher breaking load, provides a high strength. Claim 11 corresponds to such preferable embodiment.

For such support member, employable is a PTFE porous article that can be produced for example by a method described in JP-B-42-13560 and that has a large pore size and a high breaking load. The composite article utilizing such support member is a multi-layered asymmetric membrane including the expanded PTFE molded article of the invention as a layer thereof, and has a high strength, an excellent handling property and a suppressed clogging.

The expanded PTFE molded article (PTFE porous article) of the invention and the composite article of the invention described above, may be used as a filter for removing small particles from a liquid or a gas. Claim 12 provides such filter. The filter of the invention has an ability of filtration of a size less than 0.1 μm, and an excellent processing ability. In particular the filter formed by the aforementioned composite article has a high strength and an excellent handling property.

The PTFE molded article and the PTFE porous article of the invention, having characteristics of a high deformability and being significantly superior in an impact absorbing property and in a deformation following property, may be used as an impact deformation absorber for absorbing an impact or a deformation applied to the molded article, also as a PTFE pressure-sensitive adhesive tape with a satisfactory adhesiveness or as a sealing material such as a solid gasket material of a high sealing property. An invention of claim 13 provides such impact deformation absorber, and an invention of claim 14 provides such sealing material.

Effect of the Invention

The PTFE molded article of the present invention has characteristics of a higher deformability and being significantly superior in an impact absorbing property and a deformation following property in comparison with the prior PTFE molded article, and can be very effectively used in various applications such as a PTFE pressure-sensitive adhesive tape having a satisfactory adhesiveness or as a solid gasket material of a high sealing property. Also the expanded PTFE molded article of the invention, formed by expanding the PTFE molded article, is a PTFE porous article having a small pore size and a high porosity even lager than 30%, also having an ability of removing particles of a size less than 0.1 μm and a high processing ability (filtration rate).

Such PTFE molded article can be produced in stable manner by the producing method for PTFE molded article of the invention. Similarly, the expanded PTFE molded article can be produced in stable manner by the producing method for expanded PTFE molded article of the invention.

Also the composite article, obtained by reinforcing such expanded PTFE molded article with a support member, has, in addition to the excellent characteristics of the expanded PTFE molded article of the invention, a high strength, an excellent handling property and a suppressed clogging.

Also the filter of the invention, obtained by utilizing the expanded PTFE molded article or the composite article thereof, has an ability of filtration of a size less than 0.1 μm and a high filtration rate.

The impact deformation absorber of the invention is excellent in an ability of absorbing an impact or a deformation applied to the molded article.

Also the sealing material of the invention, having characteristics of a higher deformability and being significantly superior in an impact absorbing property and a deformation following property, can be advantageously utilized as a PTFE pressure-sensitive adhesive tape having a satisfactory adhesiveness or as a solid gasket material of a high sealing property.

BEST MODE FOR CARRYING OUT THE INVENTION

Now the present invention will be described by examples thereof. The present invention is not limited to such examples and may be modified to other embodiments as long as the gist of the invention is not impaired.

At first, methods of various measurements conducted in following Examples and Comparative Examples will be described. Thermal analysis (measurement of heat of fusion)

A sample of 10 to 20 mg is collected, and PTFE is sealed in an aluminum cell when necessary. It is important to maintain PTFE in a free state capable of a contracting deformation as far as possible, so that the cell is maintained in a state not crushed or not fully crushed.

The sample is subjected to heating and cooling under following conditions.

It is heated from the room temperature to 245° C. at a rate of 50° C./min, and then heated to 365° C. at a rate of 10° C./min (first step).

Then it is cooled to 350° C. at a rate of −10° C./min, and held at 350° C. for 5 minutes. Subsequently it is cooled from 350° C. to 330° C. at a rate of −10° C./min, and cooled from 330° C. to 305° C. at a rate of −1° C./min (second step). PTFE of a smaller molecular weight is liable to promote crystallization, and to result in a larger exothermic amount in the second step. Then it is cooled from 305° C. to 245° C. at a rate of −50° C./min.

Then it is heated from 245° C. to 365° C. at a rate of 10° C./min (third step).

Figure 1A:
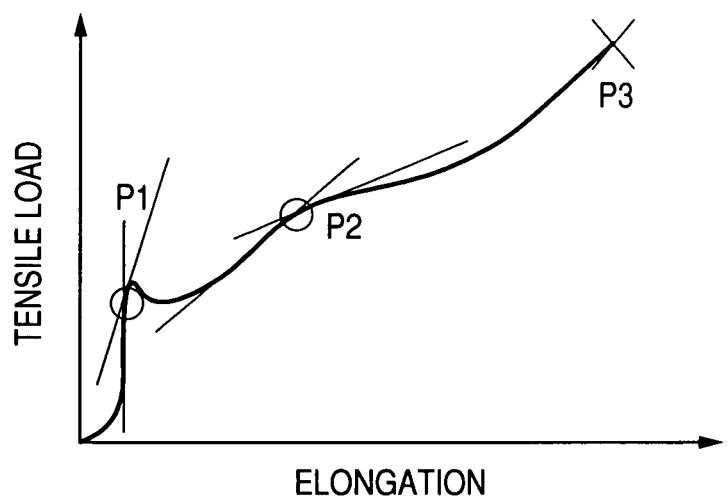
FIGS. 1(a) and 1(b) are graphs illustrating representative patterns of a load-elongation curve.
Figure 1B:
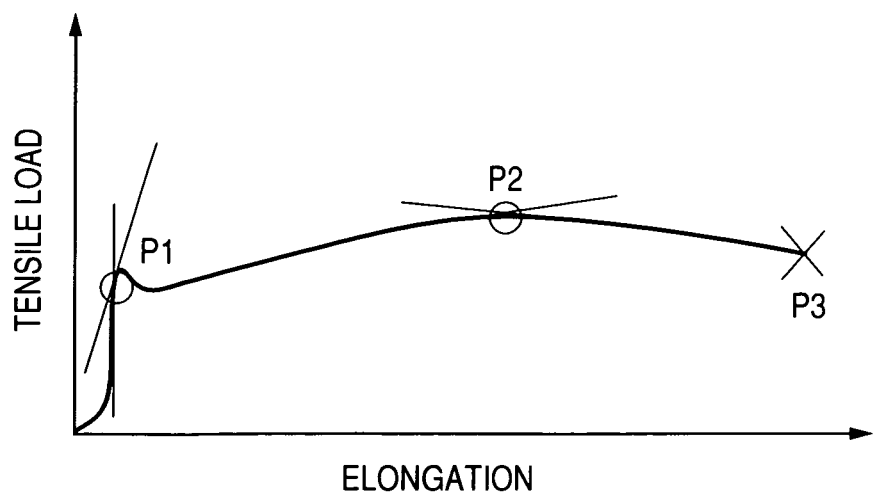
Figure 2A:
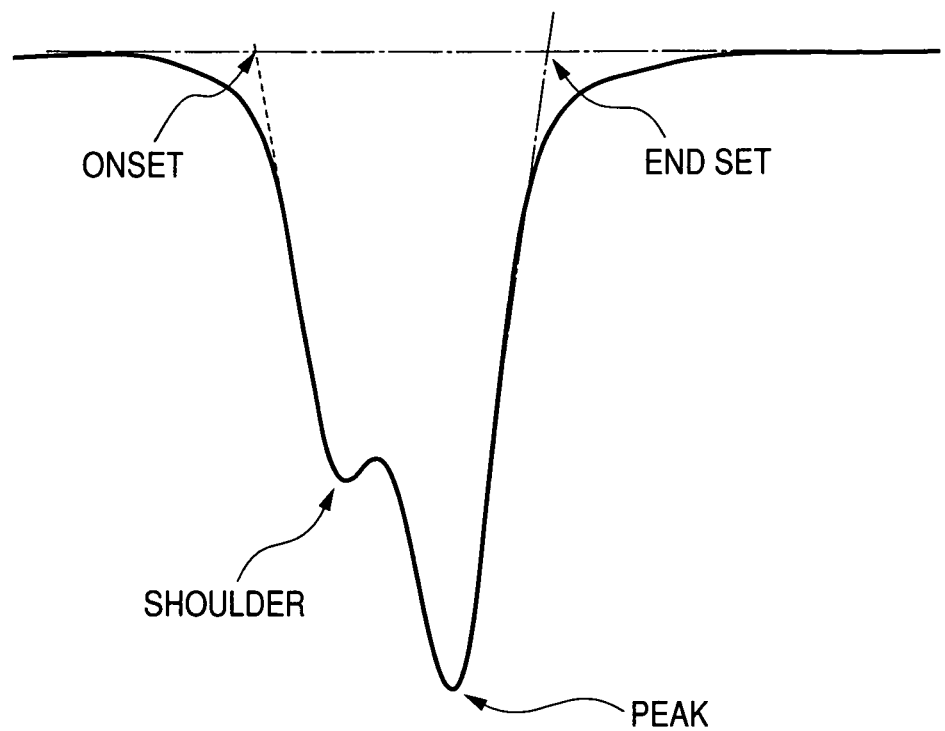
FIGS. 2(a) and 2(b) are charts illustrating examples of a DSC curve.
Figure 2B:
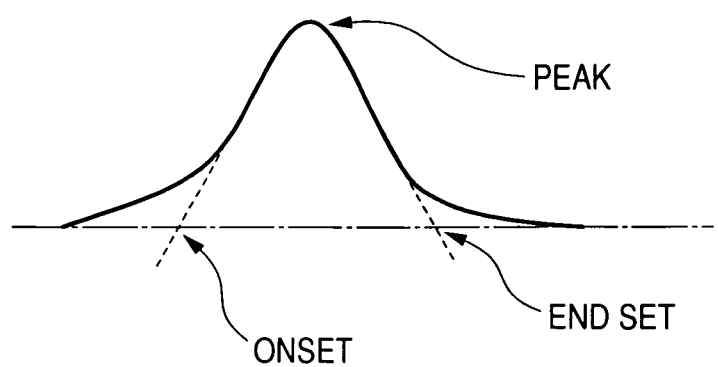

A sampling time is selected as 0.5 second/time, and a thermal flux type differential scanning calorimeter DSC-50, manufactured by Shimadzu Corp., is used to determine, as illustrated in FIG. 2, an endothermic curve (FIG. 2(a)) and an exothermic curve (FIG. 2(b)), from which an endothermic amount and an exothermic amount are determined. The endothermic amount in the first step is determined by integrating a section from 303 to 353° C., while the exothermic amount in the second step is determined by integrating a section from 318 to 309° C., and the endothermic amount in the third step is determined by integrating a section from 296 to 343° C.

Measuring Method for Expandability

An autograph with thermostat chamber (AG 500E, manufactured by Shimadzu Corp.) is used. An expanding is conducted by gripping a sample with chucks, with a sample width of 25 mm, a chuck (grip) distance of 10 mm, and a cross head speed of 1000 mm/min in an environment of 60° C., to determine a load-elongation curve, and an elongation (strain) and a tensile load (stress) are determined in each of a first yield point (P1), a second yield point (P2) and a breaking point (P3). In a sample irradiated with a radiation which is liable to be broken at the grips, a portion to be gripped is reinforced by adhering a PTFE tape (Scotch 5490, manufactured by Sumitomo-3M Co.) prior to the expanding. (As a result, breaking by the chuck could be prevented.)

Measuring Method for Porosity

On a sample, a dry weight and a weight in water are measured, and a sample volume is determined from the difference. Also taking 2.17 g/cc as a real specific gravity of PTFE, a volume of the resin constituting the sample is calculated from the dry weight. Also a ratio of a void volume, obtained by subtracting the resin volume from the sample volume, the sample volume represented by percentage is taken as a porosity.

Measuring Method for Bubbling Point

A PTFE porous article is impregnated with isopropyl alcohol to fill the pores on a wall with isopropyl alcohol, then an air pressure is gradually applied to a surface, and a pressure generating a bubble for the first time from the other surface is taken as a bubbling point.

Measuring Method for Capture Rate

A latex of spherical polystyrene particles of an external diameter of 0.055 microns (standard particle latex STADEX SC-0055-D, solid content 1%, manufactured by JSR Corp.) is diluted 1000 times with purified water (solid content 0.001%) for use as a test liquid. A prepared sample is punched into a disc shape of a diameter of 47 mm, fixed on a filtration membrane holder, and is used for filtering 32 ml of the test liquid under a differential pressure of 0.42 kgf/cm². The concentration of standard particles in the test liquid and in the test liquid after filtration is measured with a spectrophotometer UV-160 (manufactured by Shimadzu Corp.), and a capture rate is calculated according to the following formula:

capture rate={1−(standard particle concentration in filtrate)/(standard particle concentration in test liquid)}×100[%]

Example 1

PTFE fine powder (Fluon CD123, manufactured by Asahi Glass Co.), after being mixed with 25 parts by weight of naphtha, is let to stand in a sealed container for 48 hours, and then is extruded with a T-die paste extruder into a sheet of a width of 200 mm and a thickness of 3 mm. Then the thickness is regulated to 290 μm by a rolling mill. Then naphtha is removed by drying. As a result of a thermal analysis (measurement of heat of fusion) on this sheet, the endothermic curve of the first step shows a peak at 347.4° C. and a shoulder at about 342.0° C. in the low temperature side, and provides an endothermic amount of 59.7 J/g. The endothermic curve of the third step does not show an evident shoulder and shows a peak at 331.3° C., with an endothermic amount of 17.4 J/g.

The sheet is irradiated with a gamma-ray (radiation source: cobalt 60) with a dose of 2.3 kGy. As a result of thermal analysis on this sheet after the irradiation, the endothermic curve of the first step no longer shows the shoulder observed before irradiation, and shows a peak at 338.3° C., with a heat of fusion of 53.8 J/g. Also the endothermic curve of the third step does not show an evident shoulder, and shows a peak at 329.7° C., with a heat of fusion (endothermic amount) of 39.5 J/g. It is estimated that PTFE is decomposed to a lower molecular weight by the gamma-ray irradiation and is facilitated for crystallization, and that the more promoted crystallization in the second step (cooling step) leads to an increase in the heat of fusion in the third step.

Thermal analysis is conducted on sample sheets which, after the gamma-ray irradiation, are heated to 370° C. or higher, then held at this temperature for 5 minutes and cooled with various cooling rates shown in Table 1. Results are shown in Table 1.

TABLE 1

| cooling rate [° C./min] | peak ° C. | endothermal amount J/g |
| --- | --- | --- |
| 0.1 | 329.45 | 45.27 |
| 0.2 | 329.34 | 43.64 |
| 0.5 | 330.13 | 41.12 |
| 1 | 329.73 | 39.48 |
| 2 | 329.45 | 37.39 |
| 3 | 329.33 | 35.77 |
| 4 | 329.18 | 35.56 |
| 5 | 329.09 | 35.70 |
| 6 | 329.10 | 34.33 |
| 8 | 328.93 | 34.86 |
| 10 | 328.75 | 34.19 |

It is indicated that the crystallization at the cooling proceeded less for a larger cooling rate, whereby the endothermic amount (heat of fusion) becomes smaller.

Thermal analysis is conducted on sample sheets which, after the gamma-ray irradiation, are heated to 370° C. or higher, then held at this temperature for 5 minutes, further held at the temperatures shown in Table 2 for 10 minutes, and cooled with a rate of 50° C./min. Results are shown in Table 2.

TABLE 2

| holding temperature [° C.] | fusing | |
| --- | --- | --- |
| | peak ° C. | endothermic amount J/g |
| 327 | 329.14 | 27.42 |
| 324 | 329.21 | 27.01 |
| 321 | 329.17 | 27.35 |
| 318 | 330.91 | 33.29 |
| 315 | 330.12 | 31.05 |
| 312 | 329.64 | 28.86 |
| 309 | 329.54 | 28.79 |
| 306 | 329.31 | 28.67 |
| 303 | 329.40 | 28.08 |
| 300 | 329.42 | 27.31 |

Table 2 indicates that a holding at about 300 to 320° C. during the cooling process promoted the crystallization to increase the endothermic amount (heat of fusion), and that such effect is particularly evident in case of the holding at a temperature equal to or higher than 313° C. and lower than 321° C. Therefore, a thermal analysis is conducted on a sample sheet after the gamma-ray irradiation, which is heated at 370° C. for 1 minute, then cooled, held at 315° C. for 8 hours and then spontaneously cooled. As a result, the endothermic curve does not show an evident shoulder, and has a peak temperature of 332.9° C., with an endothermic amount of 46.9 J/g, indicating that the crystallization proceeded further.

This sheet, in measurement in expandability in the width direction, shows a strain of 816% at the second yield point and a strain of 2595% at the breaking point. Thereafter, this sheet is expanded by 800% in the width direction, under same conditions as in the measuring method for expandability, except that the sample width is made as 60 mm and the initial chuck distance is made as 20 mm. This membrane has a porosity of 38%. This membrane is taken as sample 1.

The sample 1 has a thickness of 189 μm. A bubbling point measured by the aforementioned method is 4.5 kg/cm² or higher, and a removing property for particles of 0.055 microns is 86%, indicating an ability capable of sufficiently removing the particles of 0.55 μm. This membrane has an IPA permeability of 100 ml/12920 seconds with a differential pressure of 1 MPa.

Example 2

A sheet is prepared in the same manner as in Example 1, except that the dose of gamma-ray (radiation source: cobalt 60) is changed to 800 Gy. As a result of thermal analysis on this sheet, the endothermic curve of the first step no longer shows the shoulder observed before irradiation, and shows a peak at 340.1° C., with a heat of fusion of 51.9 J/g. Also the endothermic curve of the third step does not show an evident shoulder, and shows a peak at 327.5° C., with a heat of fusion (endothermic amount) of 33.3 J/g.

This sheet, after being heated at 370° C. for 5 minutes by a hot air-circulating thermostat chamber, is cooled, then held at 315° C. for 8 hours and then spontaneously cooled. This sheet, in a measurement of expandability in the width direction, shows a strain of 493% at the second yield point and a strain of 2162% at the breaking point. Thereafter, this sheet is expanded by 490% in the width direction, under same conditions as in the measuring method for expandability, except that the sample width is made as 60 mm and the initial chuck distance is made as 20 mm. This membrane has a porosity of 40%.

Example 3

A sheet is prepared in the same manner as in Example 1, except that the radiation is changed to an electron beam, and that the irradiation of 5 kGy is conducted under conditions of an accelerating voltage of 2 MeV and a current of 0.5 mA. As a result of thermal analysis on this sheet, the endothermic curve of the first step no longer shows the shoulder observed before irradiation, and shows a peak at 336.5° C., with a heat of fusion of 55.0 J/g. Also the endothermic curve of the third step does not show an evident shoulder, and shows a peak at 329.8° C., with a heat of fusion (endothermic amount) of 38.2 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 1087% at the second yield point and a strain of 2280% at the breaking point. Thereafter, this sheet is expanded by 1080% in the width direction, under same conditions as in the measuring method for expandability, except that the sample width is made as 60 mm and the initial chuck distance is made as 20 mm. This membrane has a porosity of 44%.

Example 4

A sheet is prepared in the same manner as in Example 1, except that the radiation is changed to an electron beam, and that the irradiation of 3 kGy is conducted under conditions of an accelerating voltage of 2 MeV and a current of 0.5 mA. As a result of thermal analysis on this sheet, the endothermic curve of the first step no longer shows the shoulder observed before irradiation, and shows a peak at 336.2° C., with a heat of fusion of 62.8 J/g. Also the endothermic curve of the third step does not show an evident shoulder, and shows a peak at 329.8° C., with a heat of fusion (endothermic amount) of 37.3 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 647% at the second yield point and a strain of 2056% at the breaking point. Thereafter, this sheet is expanded by 640% in the width direction, under same conditions as in the measuring method for expandability, except that the sample width is made as 60 mm and the initial chuck distance is made as 20 mm. This membrane has a porosity of 42%.

Example 5

A thermal analysis is conducted on a commercial PTFE film manufactured by Nitto Denko Corp. (No. 920UL, thickness 20 μm). The endothermic curve of the first step does not show an evident shoulder, and shows a peak at 329.0° C., with a heat of fusion of 29.9 J/g. Also the endothermic curve of the third step does not show an evident shoulder, and shows a peak at 328.0° C., with an endothermic amount of 26.4 J/g.

This sheet is irradiated with an electron beam of 2.0 kGy under conditions of an accelerating voltage of 2 MeV and a current of 0.5 mA. A subsequent thermal analysis on this sheet, in the first step, does not show an evident shoulder, and shows a peak at 330.1° C., with a heat of fusion of 40.3 J/g. Also the endothermic curve of the third step does not show an evident shoulder, and shows a peak at 330.0° C., with a heat of fusion (endothermic amount) of 45.1 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 418% at the second yield point and a strain of 716% at the breaking point. Thereafter, this sheet is expanded by 400% in the width direction, under same conditions as in the measuring method for expandability, except that the sample width is made as 60 mm and the initial chuck distance is made as 20 mm. This membrane has a porosity of 56%.

Example 6

A sheet is prepared in the same manner as in Example 5, except that the dose of the electron beam is changed to 1.5 kGy, and a thermal analysis is conducted on this sheet. The first step does not show an evident shoulder, and shows a peak at 330.5° C., with a heat of fusion of 38.4 J/g. Also the endothermic curve of the third step does not show an evident shoulder, and shows a peak at 329.7° C., with a heat of fusion (endothermic amount) of 42.5 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 478% at the second yield point and a strain of 727% at the breaking point. Thereafter, this sheet is expanded by 470% in the width direction, under same conditions as in the measuring method for expandability, except that the sample width is made as 0.60 mm and the initial chuck distance is made as 20 mm. This membrane has a porosity of 52%.

Example 7

A sheet is prepared in the same manner as in Example 5, except that the dose of the electron beam is changed to 1.0 kGy, and a thermal analysis is conducted on this sheet. The first step does not show an evident shoulder, and shows a peak at 330.5° C., with a heat of fusion of 38.5 J/g. Also the endothermic curve of the third step does not show an evident shoulder, and shows a peak at 329.7° C., with a heat of fusion (endothermic amount) of 38.6 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 613% at the second yield point and a strain of 899% at the breaking point. Thereafter, this sheet is expanded by 610% in the width direction, under same conditions as in the measuring method for expandability, except that the sample width is made as 60 mm and the initial chuck distance is made as 20 mm. This membrane has a porosity of 53%. This membrane is taken as a sample 2. The sample 2 has a thickness of 27 μm. This sample has an IPA permeability of 100 ml/13200 sec.

Then this membrane is expanded in the longitudinal direction to regulate the IPA permeability to 100 ml/1500 sec. This membrane has a thickness of 25 μm. This membrane is taken as a sample 2-1. Then the sample 2-1 is further expanded in the longitudinal direction to regulate the IPA permeability to 100 ml/1250 sec. This membrane is taken as a sample 2-2. The sample 2-2 has a thickness of 25 μm. Then the sample 2-2 is further expanded in the longitudinal direction to regulate the IPA permeability to 100 ml/590 sec. This membrane is taken as a sample 2-3. The sample 2-3 has a thickness of 25 μm.

The samples 2, 2-1, 2-2 and 2-3 are subjected to the measurement of bubbling point. Each membrane can withstand a pressure of 1 kg/cm$^2$, but is broken by a pressure of 3 kg/cm$^2$ or lower, so that the bubbling point can not be measured. Therefore, the sample 2 is sandwiched between two expanded PTFE films (WP1000-100, manufactured by Sumitomo Denko Fine Polymer Co.) having a pore size of about 10 μm, a porosity of 80% and a film thickness of 100 μm. In this, FEP filaments of an external diameter of 200 μm (extrusion molded NP20, manufactured by Daikin Industries Ltd.) are positioned with an interval of 5 mm and made present between the both membranes. Then these are sandwiched between heat-resistant stainless steel plates and adhered by heating to 300° C. under a pressure. The obtained membrane is taken as 2'. Similarly, the samples 2-1 and 2-2 each is made as a composite with WP1000-100, and the obtained membranes are respectively taken as samples 2-1' and 2-2'.

The samples 2', 2-1' and 2-2' are subjected to measurements of bubbling point. The samples 2' and 2-1' have a bubbling point of 10 kg/cm$^2$ or higher (beyond the measuring limit), while the sample 2-2' has a bubbling point of 8.5 kg/cm$^2$.

Also a capture rate for the particles of 0.055 μm, measured on these samples, is 73% for the sample 2-1', 37% for the sample 2-2', and 19% for the sample 2-3'. It is thus indicated that the IPA permeability and the capture rate are controllable by the expanding.

Example 8

A sheet is prepared in the same manner as in Example 5, except that the dose of the electron beam is changed to 0.75 kGy, and a thermal analysis is conducted on this sheet. The first step does not show an evident shoulder, and shows a peak at 329.5° C., with a heat of fusion of 35.0 J/g. Also the endothermic curve of the third step does not show an evident shoulder, and shows a peak at 328.8° C., with a heat of fusion (endothermic amount) of 37.1 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 593% at the second yield point and a strain of 1068% at the breaking point. Thereafter, this sheet is expanded by 590% in the width direction, under same conditions as in the measuring method for expandability, except that the sample width is made as 60 mm and the initial chuck distance is made as 20 mm. This membrane has a porosity of 48%.

Example 9

A sheet is prepared in the same manner as in Example 5, except that the dose of the electron beam is changed to 0.5 kGy, and a thermal analysis is conducted on this sheet. The first step does not show an evident shoulder, and shows a peak at 330.1° C., with a heat of fusion of 39.1 J/g. Also the endothermic curve of the third step does not show an evident shoulder, and shows a peak at 328.7° C., with a heat of fusion (endothermic amount) of 33.2 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 490% at the second yield point and a strain of 847% at the breaking point. Thereafter, this sheet is expanded by 490% in the width direction, under same conditions as in the measuring method for expandability, except that the sample width is made as 60 mm and the initial chuck distance is made as 20 mm. This membrane has a porosity of 42%.

Example 10

A sheet is prepared in the same manner as in Example 5, except that the electron beam is changed to a current of 0.1 mA and a dose of 5 kGy, and a thermal analysis is conducted on this sheet. The first step does not show an evident shoulder, and shows a peak at 329.8° C., with a heat of fusion of 34.9 J/g. Also the endothermic curve of the third step does not show an evident shoulder, and shows a peak at 327.9° C., with a heat of fusion (endothermic amount) of 34.1 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 373% at the second yield point and a strain of 710% at the breaking point. Thereafter, this sheet is expanded by 370% in the width direction, under same conditions as in the measuring method for expandability, except that the sample width is made as 60 mm and the initial chuck distance is made as 20 mm. This membrane had a porosity of 43%.

Comparative Example 1

The PTFE sheet of Example 1 prior to the gamma-ray irradiation, after being heated at 370° C. for 5 minutes by a hot air-circulating thermostat chamber, is held at 315° C. for 8 hours and then spontaneously cooled. This sheet, in a measurement of expandability in the width direction, shows a strain of 243% at the second yield point and a strain of 1577% at the breaking point. Thereafter, this sheet is expanded by 240% in the width direction, under same conditions as in the measuring method for expandability, except that the sample width is made as 60 mm and the initial chuck distance is made as 20 mm. This membrane had a porosity of 19%.

Comparative Example 2

A sheet is prepared in the same manner as in Example 1, except that the dose of gamma-ray (radiation source: cobalt 60) is changed to 90 Gy. As a result of a thermal analysis conducted on this sheet, the first step shows a peak at 346.6° C. and a shoulder at about 340.9° C. of the low-temperature side, with a heat of fusion of 51.4 J/g. The endothermic curve of the third step does not show an evident shoulder, and shows a peak at 327.3° C., with a heat of fusion (endothermic amount) of 17.8 J/g.

This sheet, after being heated at 370° C. for 5 minutes by a hot air-circulating thermostat chamber, is cooled, then held at 315° C. for 8 hours and then spontaneously cooled. This sheet, in a measurement of expandability in the width direction, shows a strain of 283% at the second yield point and a strain of 1881% at the breaking point. Thereafter, this sheet is expanded by 280% in the width direction, under same conditions as in the measuring method for expandability, except that the sample width is made as 60 mm and the initial chuck distance is made as 20 mm. This membrane has a porosity of 21%.

Comparative Example 3

A sheet is prepared in the same manner as in Example 1, except that the dose of gamma-ray (radiation source: cobalt 60) is changed to 280 kGy. As a result of a thermal analysis conducted on this sheet, the first step shows a peak at 341.0° C. and a shoulder at about 337.6° C. of the low-temperature side, with a heat of fusion of 51.5 J/g. The endothermic curve of the third step does not show an evident shoulder, and shows a peak at 327.0° C., with a heat of fusion (endothermic amount) of 25.6 J/g.

This sheet, after being heated at 370° C. for 5 minutes by a hot air-circulating thermostat chamber, is cooled, then held at 315° C. for 8 hours and then spontaneously cooled. This sheet, in a measurement of expandability in the width direction, shows a strain of 363% at the second yield point and a strain of 2104% at the breaking point. Thereafter, this sheet is expanded by 360% in the width direction, under same conditions as in the measuring method for expandability, except that the sample width is made as 60 mm and the initial chuck distance is made as 20 mm. This membrane has a porosity of 30%.

Comparative Example 4

A sheet is prepared in the same manner as in Example 1, except that the radiation is changed to an electron beam, and that the irradiation of 1 kGy is conducted under conditions of an accelerating voltage of 2 MeV and a current of 0.5 mA. As a result of thermal analysis on this sheet, the endothermic curve of the first step no longer shows the shoulder observed before irradiation, and shows a peak at 337.2° C., with a heat of fusion of 61.7 J/g. Also the endothermic curve of the third step does not show an evident shoulder, and shows a peak at 327.3° C., with a heat of fusion (endothermic amount) of 30.9 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 590% at the second yield point and a strain of 1951% at the breaking point. Thereafter, this sheet is expanded by 590% in the width direction, under same conditions as in the measuring method for expandability, except that the sample width is made as 60 mm and the initial chuck distance is made as 20 mm. This membrane has a porosity of 28%.

Comparative Example 5

A sheet is prepared in the same manner as in Example 1, except that the radiation is changed to an electron beam, and that the irradiation of 5 kGy is conducted under conditions of an accelerating voltage of 2 MeV and a current of 0.1 mA. As a result of thermal analysis on this sheet, the first step shows a peak at 343.8° C. and a shoulder at about 339.8° C. at the low-temperature side, with a heat of fusion of 49.7 J/g. Also the endothermic curve of the third step does not show an evident shoulder, and shows a peak at 329.3° C., with a heat of fusion (endothermic amount) of 19.4 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 648% at the second yield point and a strain of 1645% at the breaking point. Thereafter, this sheet is expanded by 640% in the width direction, under same conditions as in the measuring method for expandability, except that the sample width is made as 60 mm and the initial chuck distance is made as 20 mm. This membrane has a porosity of 25%.

Comparative Example 6

The sheet of Example 5 prior to the electron beam irradiation, after being heated at 370° C. for 5 minutes by a hot air-circulating thermostat chamber, is held at 315° C. for 8 hours and then spontaneously cooled. This sheet, in a measurement of expandability in the width direction, shows a strain of 325% at the second yield point and a strain of 670% at the breaking point. Thereafter, this sheet is expanded by 320% in the width direction, under same conditions as in the measuring method for expandability, except that the sample width is made as 60 mm and the initial chuck distance is made as 20 mm. This membrane has a porosity of 22%.

Comparative Example 7

A sheet is prepared in the same manner as in Example 5, except that the dose of electron beam is changed to 2.5 kGy. As a result of a thermal analysis conducted on this sheet, the first step does not show an evident shoulder, and shows a peak at 329.9° C., with a heat of fusion of 43.5 J/g. The endothermic curve of the third step does not show an evident shoulder, and shows a peak at 329.4° C., with a heat of fusion (endothermic amount) of 47.8 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 330% at the second yield point and a strain of 398% at the breaking point. Thereafter, this sheet is expanded by 330% in the width direction, under same conditions as in the measuring method for expandability, except that the sample width is made as 60 mm and the initial chuck distance is made as 20 mm. This membrane has a porosity of 48%. However, visually observable defects such as pinholes are generated in a large number.

Comparative Example 8

A sheet is prepared in the same manner as in Example 5, except that the dose of electron beam is changed to 3 kGy. As a result of a thermal analysis conducted on this sheet, the first step does not show an evident shoulder, and shows a peak at 330.9° C., with a heat of fusion of 43.7 J/g. The endothermic curve of the third step does not show an evident shoulder, and shows a peak at 330.8° C., with a heat of fusion (endothermic amount) of 48.4 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 34% at the breaking point, and is brittle and hardly expandable.

Comparative Example 9

A sheet is prepared in the same manner as in Example 5, except that the electron beam is changed to a current of 0.1 mA and a dose of 3 kGy. As a result of a thermal analysis conducted on this sheet, the first step does not show an evident shoulder, and shows a peak at 329.1° C., with a heat of fusion of 29.2 J/g. The endothermic curve of the third step does not show an evident shoulder, and shows a peak at 327.7° C., with a heat of fusion (endothermic amount) of 30.3 J/g.

This sheet, after being heated at 370° C. for 5 minutes by a hot air-circulating thermostat chamber, is held at 315° C. for 8 hours and then spontaneously cooled. This sheet, in a measurement of expandability in the width direction, shows a strain of 330% at the second yield point and a strain of 675% at the breaking point. Thereafter, this sheet is expanded by 330% in the width direction, under same conditions as in the measuring method for expandability, except that the sample width is made as 60 mm and the initial chuck distance is made as 20 mm. This membrane has a porosity of 19%.

Experimental conditions of Examples and Comparative Examples above, and results of thermal analyses such as endothermic amount (heat of fusion) are shown in Table 3. Also results of measurement of expandability and porosities obtained in expanding to the second yield point are shown in Table 4. Results shown in Tables 3 and 4 indicate that, in examples of the present invention (Examples) in which the heat of fusion (endothermic amount) in the third step is equal to or higher than 32 J/g and less than 48 J/g, a large expanding is possible in a range before the second yield point where fine pores can be formed and pore size shows little fluctuation, thus indicating an excellent deformability of PTFE, and that a high porosity larger than 30% can be obtained. Also based on the capture rate for the particles of 0.055 μm and on the result of measurement of IPA permeability in Examples 1 and 7, it is indicated that the examples of the present invention (Examples) can provide a filter having an ability of sufficiently filtration and controlling particles of a size of 0.1 μm or less. It is therefore indicated that the present invention can provide expanded PTFE that has a high porosity while having fine pores, thus having characteristics not available in the prior expanded PTFE.

TABLE 3

| | radiation irradiating condition | | first step (endothermic curve) | | | second step (exothermic curve) | | | third step (endothermic curve) | | |
|---|---|---|---|---|---|---|---|---|---|---|---|
| | type | dose (kGy) | shoulder °C. | peak °C. | endothermic amount J/g | shoulder | peak °C. | endothermic amount J/g | shoulder | peak °C. | endothermic amount J/g |
| Following Examples 1-4 and Comparative Examples 1-5 employ, as PTFE, paste extruded molds (unsintered) of 250 μm in thickness | | | | | | | | | | | |
| Example 1 | gamma-ray | 2.3 | none | 338.8 | 53.8 | none | 315.5 | 32.9 | none | 329.7 | 39.5 |
| Example 2 | gamma-ray | 0.8 | none | 340.1 | 51.9 | none | | | none | 327.5 | 33.3 |
| Example 3 | e-beam 0.5 mA | 5.0 | none | 336.5 | 55.0 | none | 315.6 | 31.6 | none | 329.8 | 38.2 |
| Example 4 | e-beam 0.5 mA | 3.0 | none | 336.2 | 62.8 | none | 316.1 | 28.2 | none | 327.5 | 37.3 |
| Comp. Ex. 1 | none | | 342.0 | 347.4 | 59.7 | none | 315.6 | 11.7 | none | 327.1 | 17.4 |
| Comp. Ex. 2 | gamma-ray | 0.1 | 340.9 | 346.6 | 51.4 | none | | | none | 327.3 | 17.8 |
| Comp. Ex. 3 | gamma-ray | 0.3 | 337.6 | 341.0 | 51.5 | none | | | none | 327.0 | 25.6 |
| Comp. Ex. 4 | e-beam 0.5 mA | 1.0 | none | 337.2 | 61.7 | none | 316.2 | 20.1 | none | 327.3 | 30.9 |
| Comp. Ex. 5 | e-beam 0.1 mA | 5.0 | 339.8 | 343.8 | 49.7 | none | 315.9 | 11.8 | none | 329.3 | 19.4 |
| Following Examples 5-10 and Comparative Examples 6-9 employ, as PTFE, a commercial PTFE film (sintered) of 20 μm in thickness | | | | | | | | | | | |
| Example 5 | e-beam 0.5 mA | 2.0 | none | 330.1 | 40.3 | none | 314.3 | 37.5 | none | 330.0 | 45.1 |
| Example 6 | e-beam 0.5 mA | 1.5 | none | 330.5 | 38.4 | none | 314.4 | 35.7 | none | 329.7 | 42.5 |
| Example 7 | e-beam 0.5 mA | 1.0 | none | 330.5 | 38.5 | none | 314.2 | 32.7 | none | 329.7 | 38.6 |
| Example 8 | e-beam 0.5 mA | 0.75 | none | 329.5 | 35.0 | none | 314.2 | 26.1 | none | 328.8 | 37.1 |
| Example 9 | e-beam 0.5 mA | 0.5 | none | 330.1 | 39.1 | none | 314.5 | 25.2 | none | 328.7 | 33.2 |
| Example 10 | e-beam 0.1 mA | 5.0 | none | 329.8 | 34.9 | none | 314.6 | 26 | none | 327.9 | 34.1 |
| Comp. Ex. 6 | None | | none | 329.0 | 29.9 | none | 314.5 | 15.1 | none | 328.0 | 26.4 |
| Comp. Ex. 7 | e-beam 0.5 mA | 2.5 | none | 329.9 | 43.5 | none | 314.6 | 41.2 | none | 329.4 | 47.8 |
| Comp. Ex. 8 | e-beam 0.5 mA | 3.0 | none | 330.9 | 43.7 | none | 314.5 | 40.9 | none | 330.8 | 48.4 |
| Comp. Ex. 9 | e-beam 0.1 mA | 3.0 | none | 329.1 | 29.2 | none | 314.7 | 18.8 | none | 327.7 | 30.3 |

TABLE 4

| | first yield point | | second yield point | | breaking point | | porosity in expanded article % |
|---|---|---|---|---|---|---|---|
| | stress MPa | strain % | stress MPa | strain % | stress MPa | strain % | |
| case of using paste extruded molds (unsintered) of 250 μm in thickness | | | | | | | |
| Example 1 | 9.7 | 36 ± 5 | 9.2 | 816 ± 125 | 10.2 | 2595 ± 272 | 38 |
| Example 2 | 10.3 | 47 ± 5 | 10.3 | 493 ± 50 | 14.9 | 2162 ± 210 | 40 |
| Example 3 | 9.2 | 27 ± 9 | 11.3 | 1087 ± 50 | 16.3 | 2280 ± 61 | 44 |
| Example 4 | | | | 647 ± 21 | | 2056 ± 101 | 42 |
| Comp. Ex. 1 | 10.7 | 67 ± 5 | 11.0 | 243 ± 54 | 23.2 | 1577 ± 146 | 19 |
| Comp. Ex. 2 | 11.1 | 70 ± 8 | 11.3 | 283 ± 29 | 24.8 | 1881 ± 130 | 21 |
| Comp. Ex. 3 | 10.4 | 57 ± 5 | 10.5 | 363 ± 12 | 20.3 | 2104 ± 155 | 30 |
| Comp. Ex. 4 | | | | 590 ± 70 | | 1951 ± 89 | 28 |
| Comp. Ex. 5 | | | | 648 ± 43 | | 1645 ± 130 | 25 |
| case of using a commercial PTFE film (sintered) of 20 μm in thickness | | | | | | | |
| Example 5 | | | | 418 ± 36 | | 716 ± 86 | 56 |
| Example 6 | | | | 478 ± 59 | | 727 ± 86 | 52 |
| Example 7 | | | | 613 ± 98 | | 899 ± 13.3 | 53 |
| Example 8 | | | | 593 ± 30 | | 1068 ± 50 | 48 |
| Example 9 | | | | 490 ± 24 | | 847 ± 116 | 42 |
| Example 10 | 9.3 | 40 ± 0 | 15.6 | 373 ± 19 | 23.6 | 710 ± 80 | 43 |
| Comp. Ex. 6 | 10.2 | 38 ± 4 | 21.2 | 325 ± 38 | 38.0 | 670 ± 70 | 22 |
| Comp. Ex. 7 | | | | 330 ± 115 | | 398 ± 48 | 48* |

TABLE 4-continued

| | first yield point | | second yield point | | breaking point | | porosity in |
|---|---|---|---|---|---|---|---|
| | stress MPa | strain % | stress MPa | strain % | stress MPa | strain % | expanded article % |
| Comp. Ex. 8 | | 34 ± 5 | ←broken at first yield point | | | | |
| Comp. Ex. 9 | | | | 330 ± 65 | | 675 ± 32 | 19 |

*however, generating visually observable defects, such as pinholes, in a large amount

The invention claimed is:

1. A method for producing an expanded tetrafluoroethylene resin molded article, comprising:
   a fusing step of fusing a tetrafluoroethylene resin by heating the tetrafluoroethylene resin to a melting temperature thereof or higher, the tetrafluoroethylene resin, when heated to 365° C., then cooled to 305° C. with a rate of −1° C./min, then further cooled to 245° C. and heated to 365° C. with a rate of 10° C./min, having a heat of fusion which, within a range from 296 to 343° C., is equal to or larger than 32 J/g and less than 47.8 J/g, by heating to a melting temperature thereof or higher;
   a step of cooling, after the step of fusing, the fused tetrafluoroethylene resin at a rate of −3° C./min or slower;
   a step of holding, after the step of cooling or during the step of cooling, at a temperature equal to or higher than 313° C. and lower than 321° C. for 10 minutes or longer; and
   a step of expanding, after the step of cooling and the step of holding, the tetrafluoroethylene resin obtained by the steps of fusing, cooling and holding.

2. The method for producing an expanded tetrafluoroethylene resin molded article according to claim 1, wherein the tetrafluoroethylene resin is powder or granular tetrafluoroethylene resin of which the heat of fusion is so regulated as to be equal to or larger than 32 J/g and less than 47.8 J/g.

3. A method for producing an expanded tetrafluoroethylene resin molded article, comprising:
   a fusing step of fusing a tetrafluoroethylene resin by heating the tetrafluoroethylene resin to a melting temperature thereof or higher, the tetrafluoroethylene resin, when heated to 365° C., then cooled to 305° C. with a rate of −1° C./min, then further cooled to 245° C. and heated to 365° C. with a rate of 10° C./min, having a heat of fusion which, within a range from 296 to 343° C., is less than 32 J/g, by heating to a melting temperature thereof or higher;
   after the fusing step, a molding step of molding the fused resin; and
   after the molding step, a step of regulating the heat of fusion so as to be equal to or larger than 32 J/g and less than 47.8 J/g, wherein:
   the fusing step further comprises:
      a step of cooling, after fusing the tetrafluoroethylene resin, the fused tetrafluoroethylene resin at a rate of −3° C./min or slower; and
      a step of holding, after the step of cooling or during the step of cooling, at a temperature equal to or higher than 313° C. and lower than 321° C. for 10 minutes or longer, and
   the method further comprises a step of expanding the tetrafluoroethylene resin obtained by the steps of fusing and molding.

4. The method for producing an expanded tetrafluoroethylene resin molded article according to claim 3, wherein the heat of fusion is regulated by a method of irradiating the tetrafluoroethylene resin with an isolating radiation so as to obtain a heat of fusion which is equal to or larger than 32 J/g and less than 47.8 J/g.

* * * * *